US010778908B2

(12) United States Patent
Chang

(10) Patent No.: US 10,778,908 B2
(45) Date of Patent: Sep. 15, 2020

(54) METHOD FOR CORRECTING IMAGE OF MULTI-CAMERA SYSTEM BY USING MULTI-SPHERE CORRECTION DEVICE

(71) Applicant: 3DIGIVIEW ASIA CO., LTD., Goyang-si (KR)

(72) Inventor: Christopher Chinho Chang, Pleasanton, CA (US)

( * ) Notice: Subject to any disclaimer, the term of this patent is extended or adjusted under 35 U.S.C. 154(b) by 0 days.

(21) Appl. No.: 15/757,337

(22) PCT Filed: Sep. 5, 2016

(86) PCT No.: PCT/KR2016/009914
§ 371 (c)(1),
(2) Date: Mar. 2, 2018

(87) PCT Pub. No.: WO2017/039418
PCT Pub. Date: Mar. 9, 2017

(65) Prior Publication Data
US 2018/0249088 A1     Aug. 30, 2018

(30) Foreign Application Priority Data
Sep. 3, 2015   (KR) .................. 10-2015-0125093

(51) Int. Cl.
*H04N 5/262*     (2006.01)
*H04N 5/232*     (2006.01)
(Continued)

(52) U.S. Cl.
CPC ............ *H04N 5/262* (2013.01); *H04N 5/232* (2013.01); *H04N 5/23216* (2013.01); *H04N 5/247* (2013.01); *H04N 17/002* (2013.01)

(58) Field of Classification Search
CPC .... H04N 5/262; H04N 5/232; H04N 5/23216; H04N 5/247; H04N 17/002; H04N 13/128
See application file for complete search history.

(56) References Cited

U.S. PATENT DOCUMENTS 5,699,444 A * 12/1997 Palm ...................... G01C 11/06
                                                    382/106
6,201,882 B1 * 3/2001 Tanaka .................... G06T 7/80
                                                    382/106
(Continued)

FOREIGN PATENT DOCUMENTS

JP      2004-266511 A      9/2004
KR    10-0987775 B1     10/2010
(Continued)

OTHER PUBLICATIONS

Cho, Kyeong Seok, "A Study on Methods of Extracting Standard Dot Pattern Information and Compensating Distorted Images using Reference Dot Pattern Images," Graduate School of Hallym University, Master's Thesis, pp. 25-27, 31-49 (Dec. 2007).

*Primary Examiner* — Brian P Yenke
(74) *Attorney, Agent, or Firm* — Loza & Loza, LLP; Thomas H. Ham

(57)     ABSTRACT

A method for correcting an image of a multi-camera system by using a multi-sphere correction device is disclosed. According to the present invention, the method for correcting an image of a multi-camera system by using a correction unit and a multi-sphere correction device having two or more spheres, which are vertically arranged on a support at certain intervals, comprises: (a) a correction variable acquisition step of determining, by the correction unit, a correction variable value for a geometric error of each camera by using the multi-sphere correction device; and (b) an image correction step of correcting an image obtained by photographing an actual subject by using the correction variable acquired in step (a), and outputting the corrected image, thereby enabling a more accurate image to be captured since a geometric error of each camera is corrected.

7 Claims, 18 Drawing Sheets

(51) Int. Cl.
*H04N 5/247* (2006.01)
*H04N 17/00* (2006.01)

(56) References Cited

U.S. PATENT DOCUMENTS

| | | | | |
|---|---|---|---|---|
| 6,322,248 | B1* | 11/2001 | Yanagita | A61B 6/032 378/11 |
| 6,327,381 | B1* | 12/2001 | Rogina | G06T 15/10 382/154 |
| 6,793,350 | B1* | 9/2004 | Raskar | G03B 37/04 353/121 |
| 6,861,181 | B1* | 3/2005 | Henderson | G03F 1/84 382/144 |
| 7,113,632 | B2* | 9/2006 | Lee | G06K 9/03 348/E13.014 |
| 8,593,524 | B2* | 11/2013 | Kleihorst | G06T 7/85 348/175 |
| 8,917,317 | B1* | 12/2014 | Beeler | G01B 11/2504 348/47 |
| 9,235,897 | B2* | 1/2016 | Kakuko | H04N 13/00 |
| 9,270,976 | B2* | 2/2016 | Houvener | G03B 35/08 |
| 9,497,380 | B1* | 11/2016 | Jannard | H04N 5/23238 |
| 9,532,036 | B2* | 12/2016 | Kim | H04N 13/349 |
| 9,674,504 | B1* | 6/2017 | Salvagnini | G01S 17/89 |
| 10,080,007 | B2* | 9/2018 | Ren | H04N 13/239 |
| 10,277,887 | B2* | 4/2019 | Aoki | H04N 13/246 |
| 2003/0222984 | A1* | 12/2003 | Zhang | H04N 17/002 348/187 |
| 2005/0066534 | A1* | 3/2005 | Matsuda | G01B 21/042 33/502 |
| 2005/0172695 | A1* | 8/2005 | Furze | G01B 21/042 73/1.01 |
| 2006/0208980 | A1* | 9/2006 | Okumura | G09G 3/20 345/87 |
| 2007/0016386 | A1* | 1/2007 | Husted | G01C 17/00 702/150 |
| 2007/0165942 | A1* | 7/2007 | Jin | H04N 13/20 382/154 |
| 2009/0028440 | A1* | 1/2009 | Elangovan | G06T 7/248 382/216 |
| 2009/0076655 | A1* | 3/2009 | Blondel | B25J 9/1692 700/254 |
| 2010/0020178 | A1* | 1/2010 | Kleihorst | G06T 7/85 348/175 |
| 2010/0150455 | A1* | 6/2010 | Oyama | G01C 3/085 382/219 |
| 2011/0316968 | A1* | 12/2011 | Taguchi | H04N 5/23238 348/36 |
| 2013/0039586 | A1* | 2/2013 | Fuchigami | G06T 7/564 382/199 |
| 2013/0135439 | A1* | 5/2013 | Kakuko | H04N 13/00 348/46 |
| 2013/0195239 | A1* | 8/2013 | O'Hare | G01T 7/005 378/4 |
| 2013/0265442 | A1* | 10/2013 | Maekawa | G06T 7/80 348/187 |
| 2014/0015924 | A1* | 1/2014 | Pryor | G06T 15/20 348/43 |
| 2014/0043447 | A1* | 2/2014 | Huang | H04N 13/0246 348/51 |
| 2015/0052767 | A1 | 2/2015 | Sagemueller et al. | |
| 2015/0084951 | A1* | 3/2015 | Boivin | H04N 5/272 345/419 |
| 2015/0260859 | A1* | 9/2015 | Christoph | G01B 15/04 378/207 |
| 2016/0353083 | A1* | 12/2016 | Aoki | H04N 13/246 |
| 2017/0098305 | A1* | 4/2017 | Gossow | G06T 3/40 |
| 2018/0241950 | A1* | 8/2018 | Chang | H04N 5/262 |

FOREIGN PATENT DOCUMENTS

| | | |
|---|---|---|
| KR | 10-2011-0050843 A | 5/2011 |
| KR | 10-2011-0071854 A | 6/2011 |
| KR | 10-1457888 B1 | 11/2014 |
| KR | 10-2015-0028474 A | 3/2015 |

\* cited by examiner

[Fig.1]
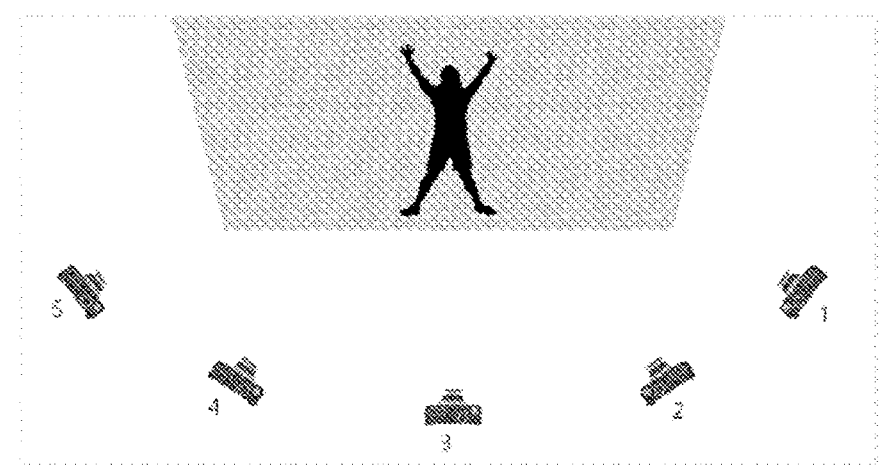
[Fig.2]

[Fig.3]
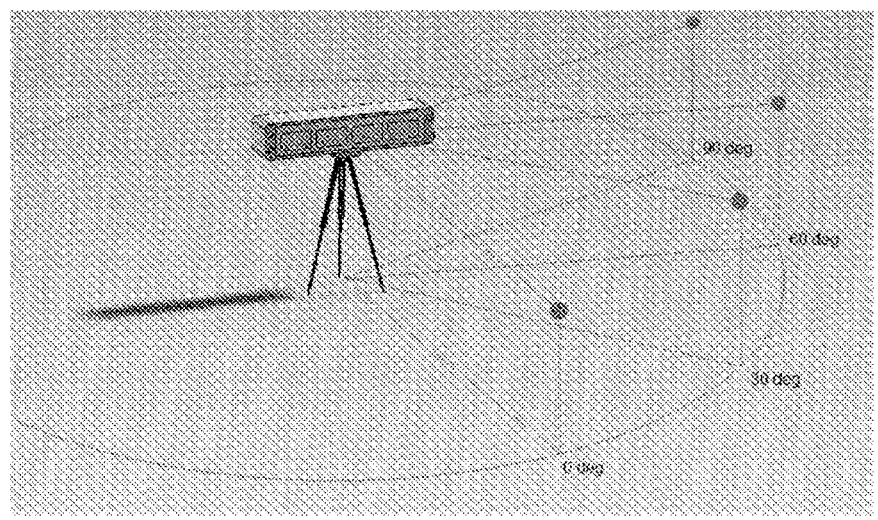

[Fig.4]
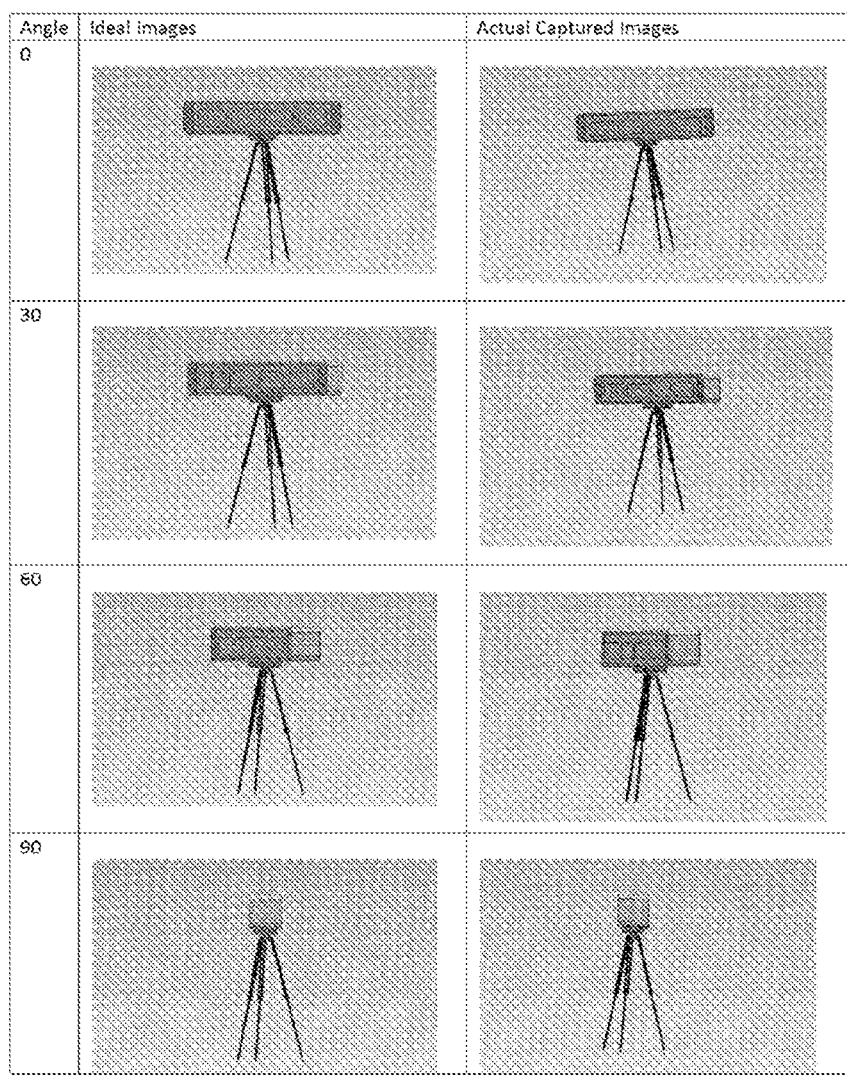

[Fig.5]
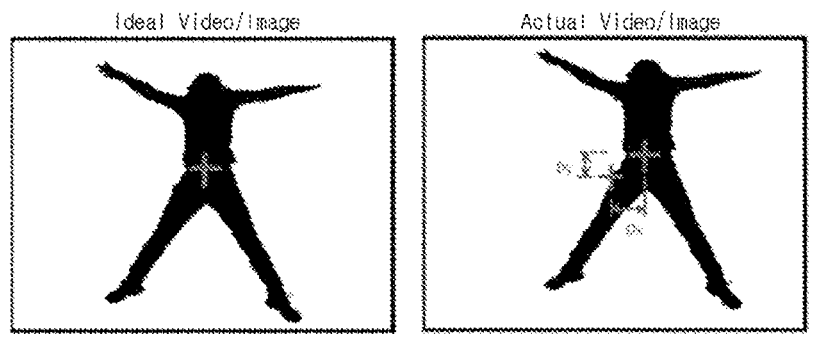
[Fig.6]
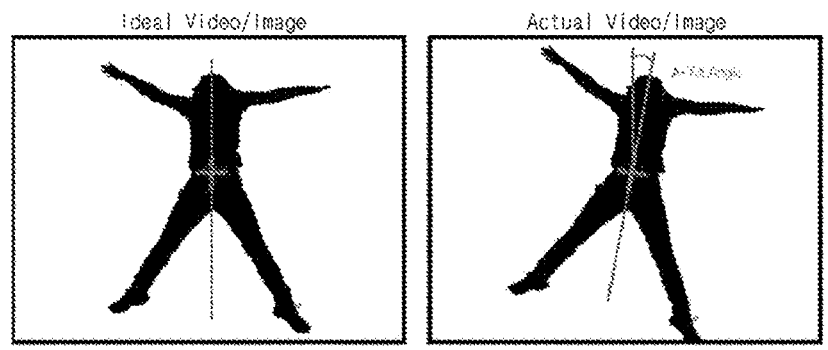
[Fig.7]
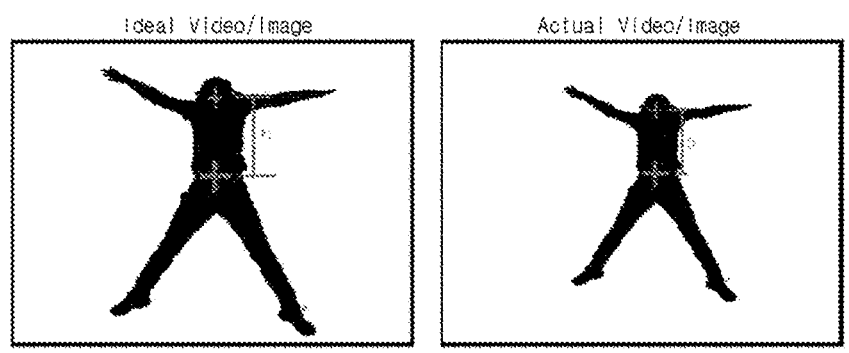

[Fig.8]
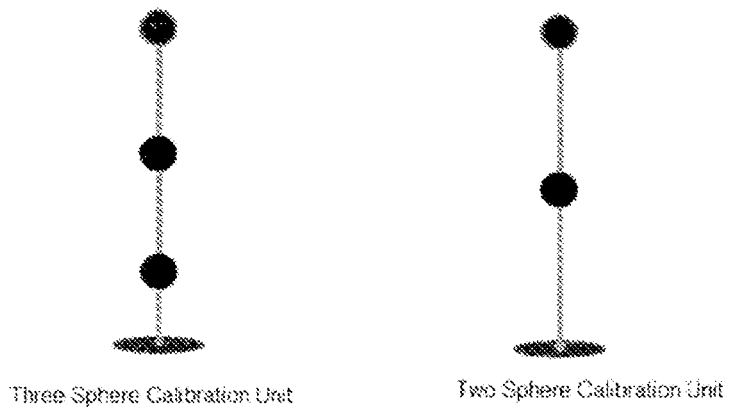
[Fig.9]
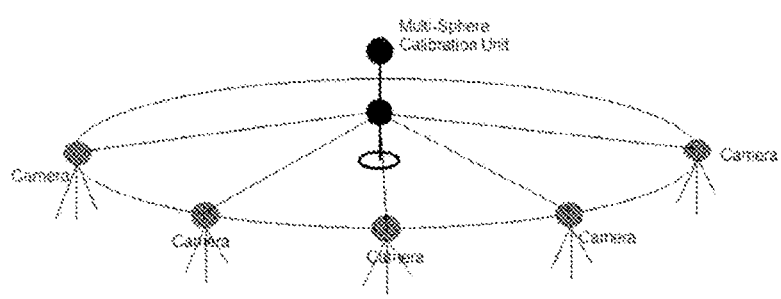

[Fig.10]
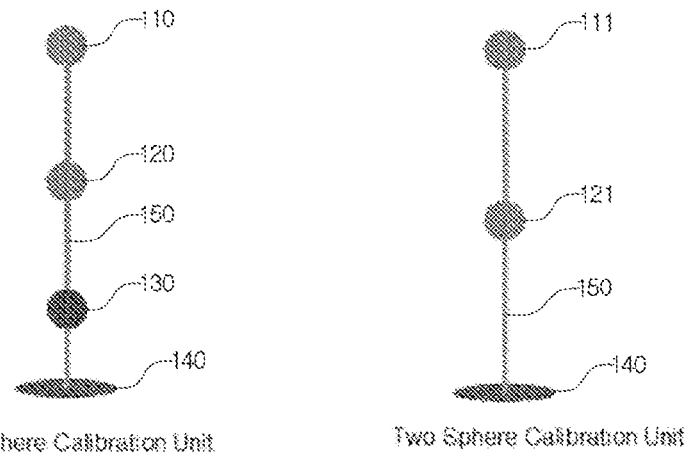
Three Sphere Calibration Unit    Two Sphere Calibration Unit
[Fig.11]
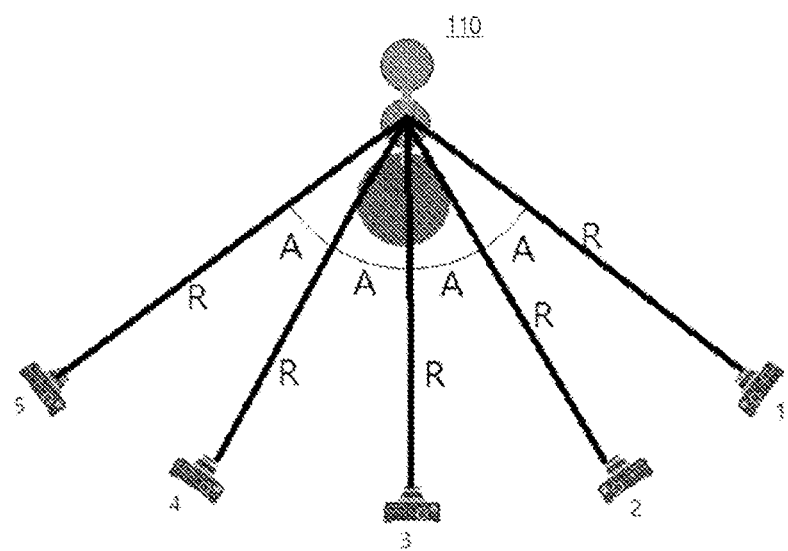

[Fig.12]
[Fig.13]
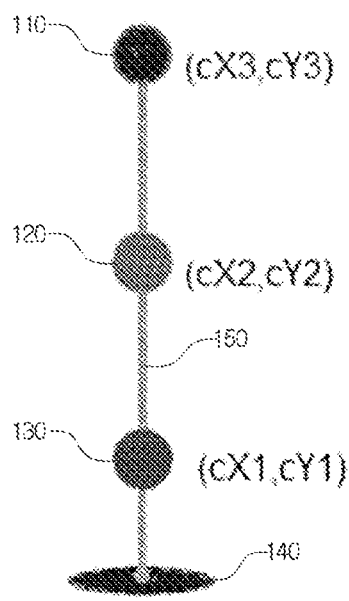

[Fig.14]
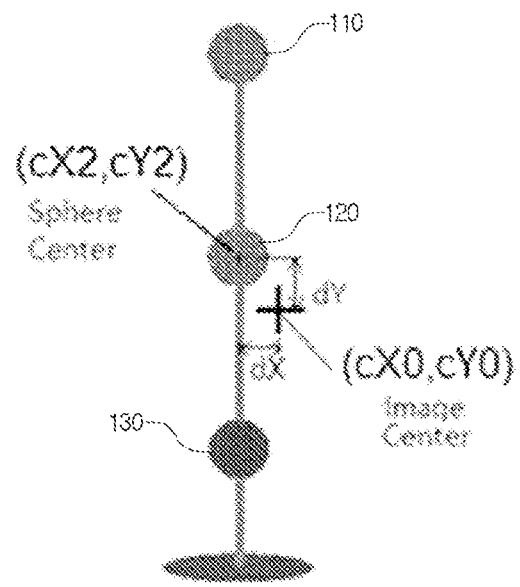
[Fig.15]
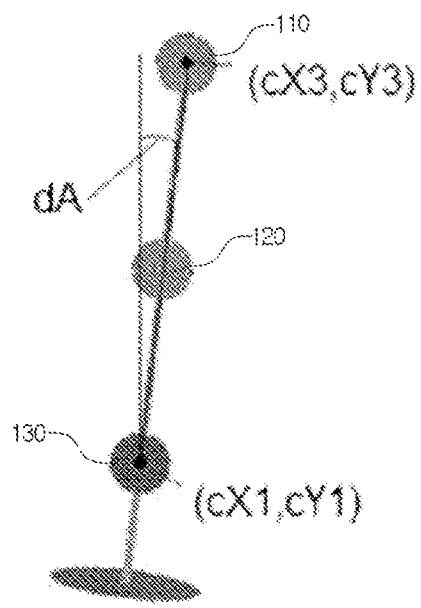

[Fig.16]
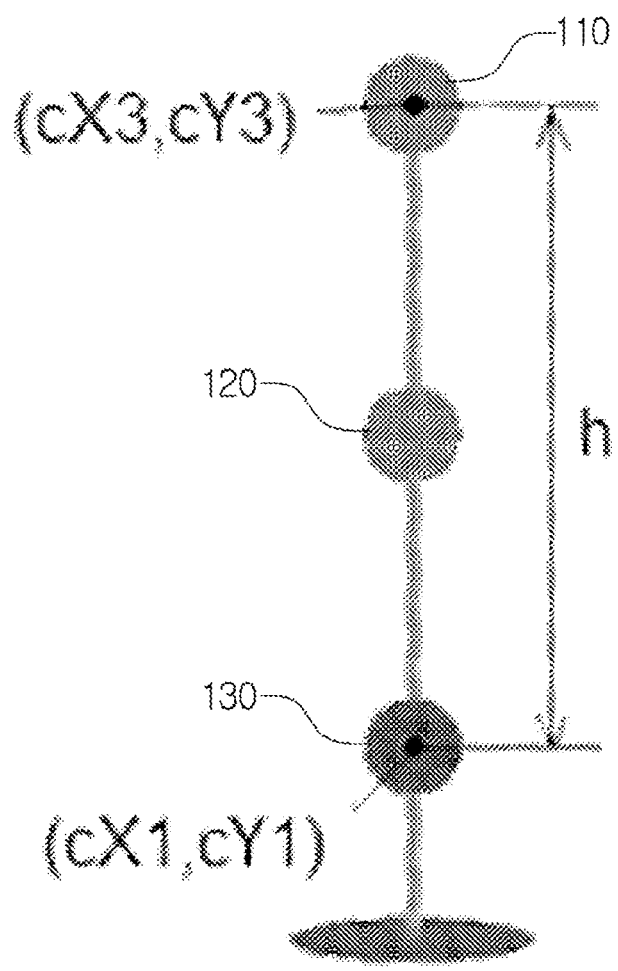

[Fig.17]
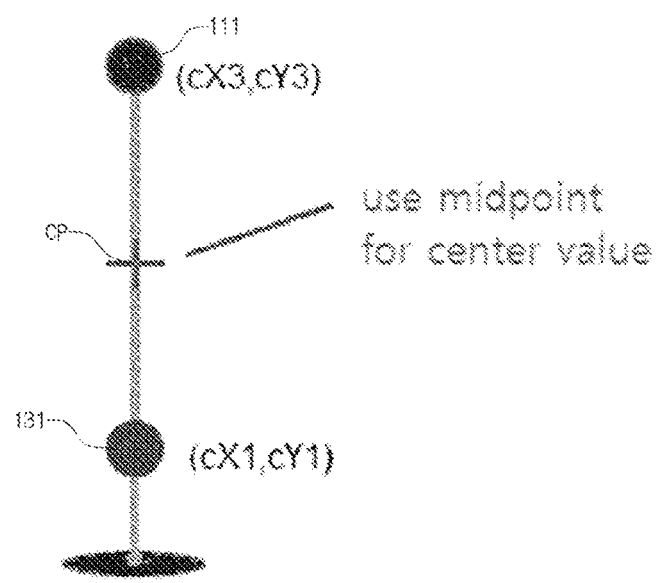

[Fig.18]
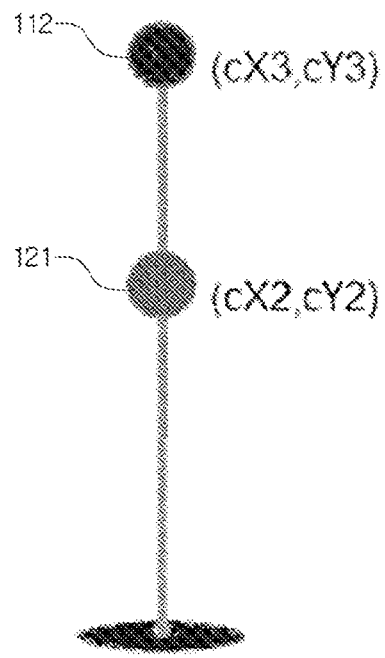

[Fig.19]
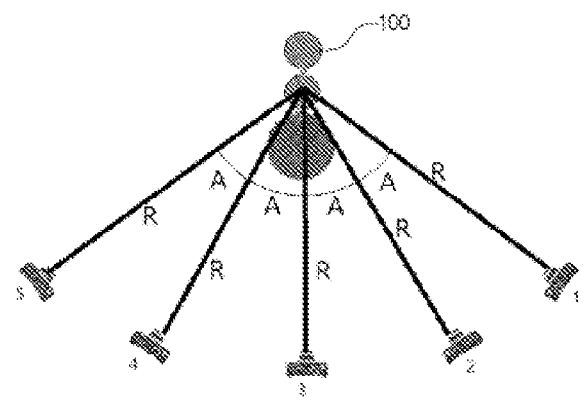
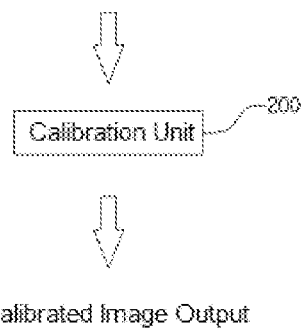
Calibrated Image Output
[Fig.20]
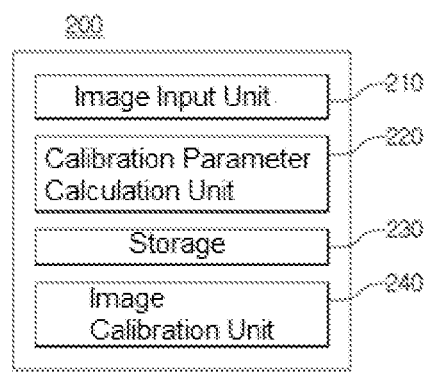

[Fig.21]
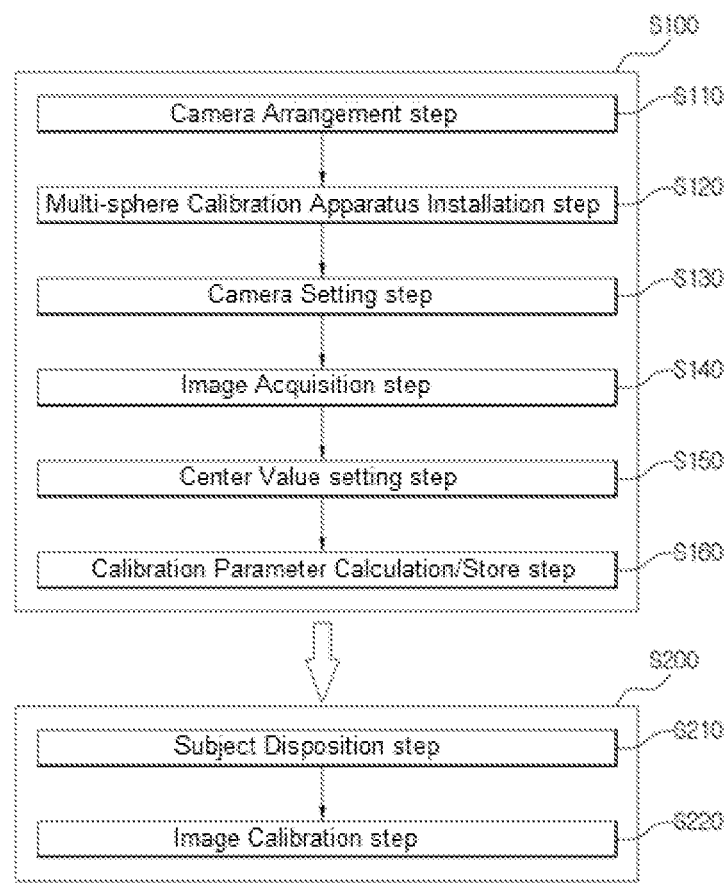

[Fig.22]
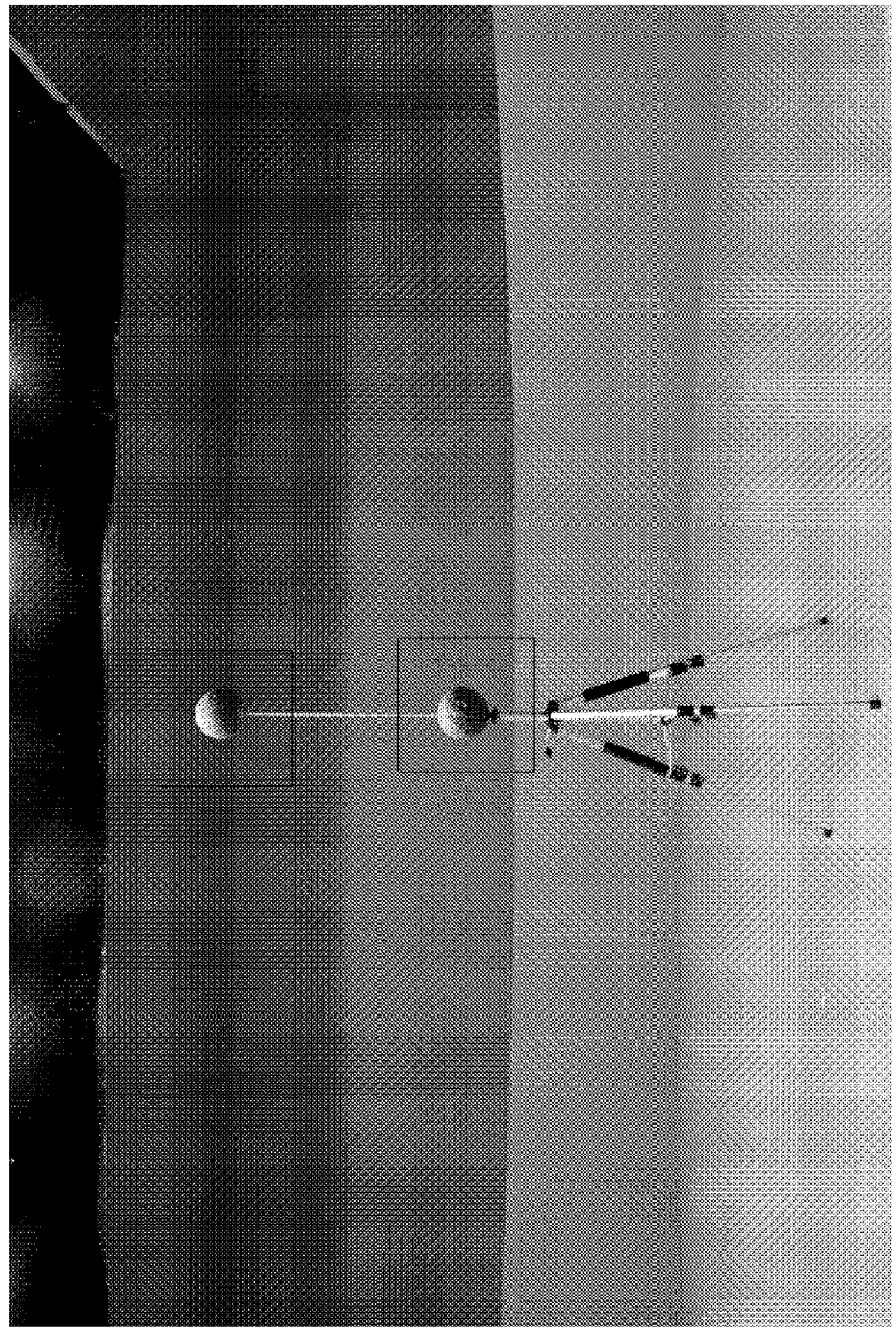

[Fig.23]
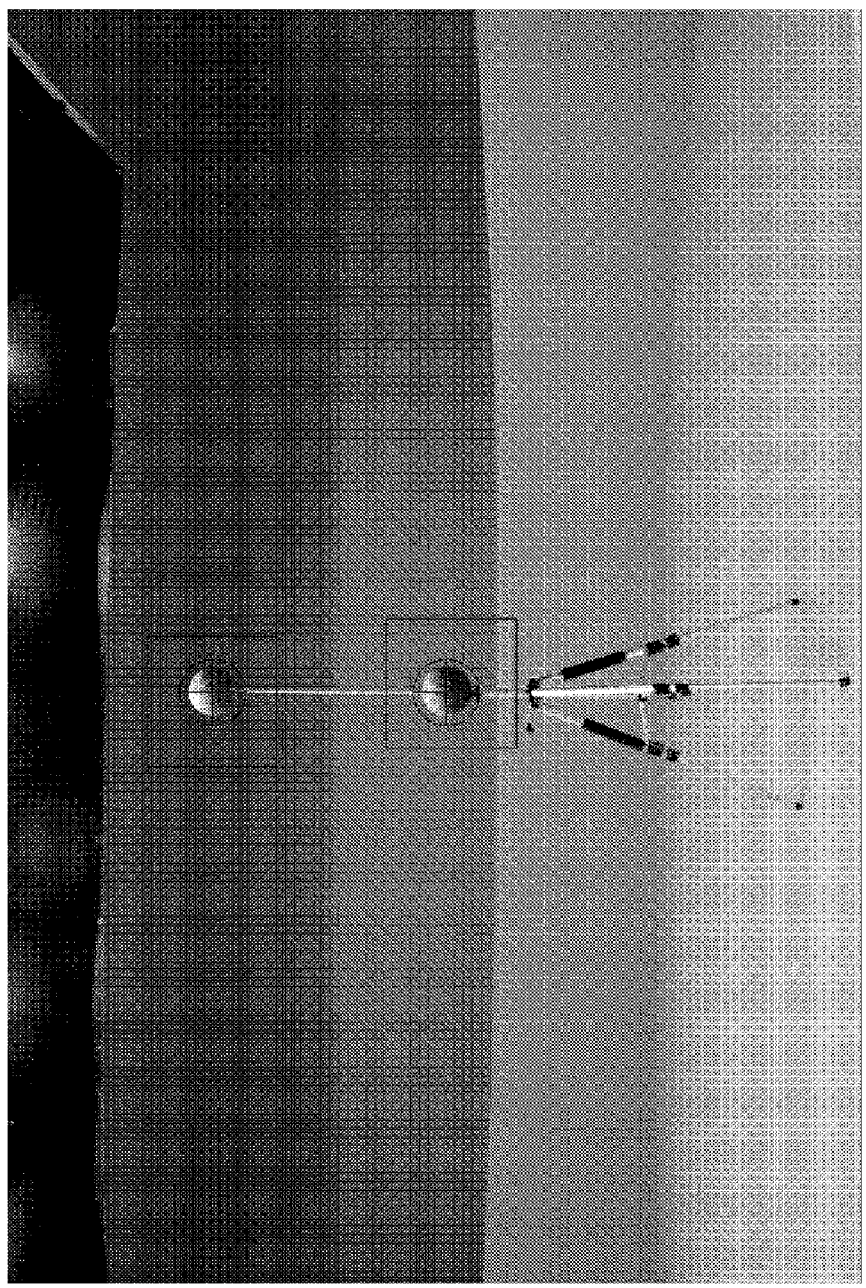

[Fig.24]
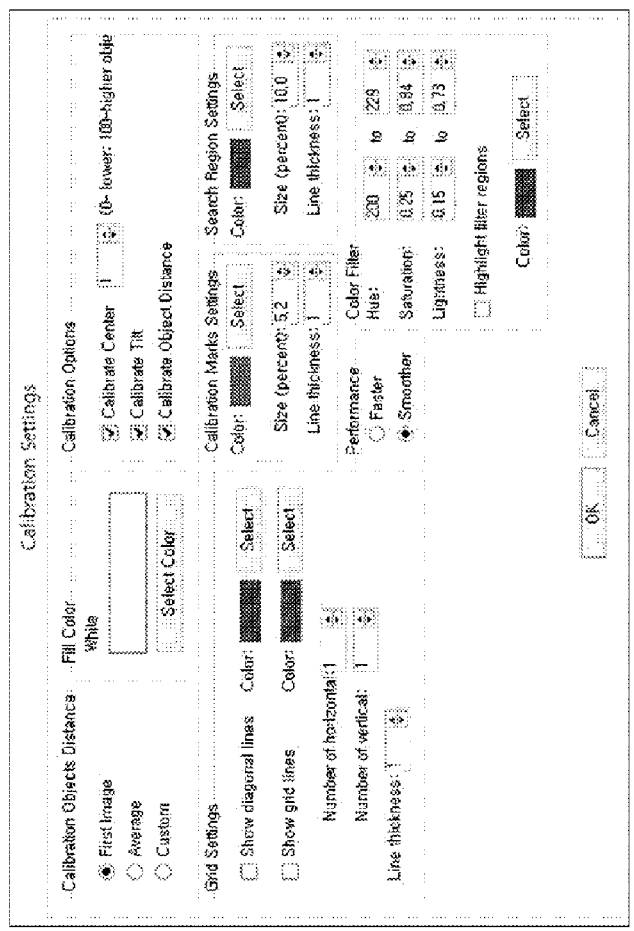
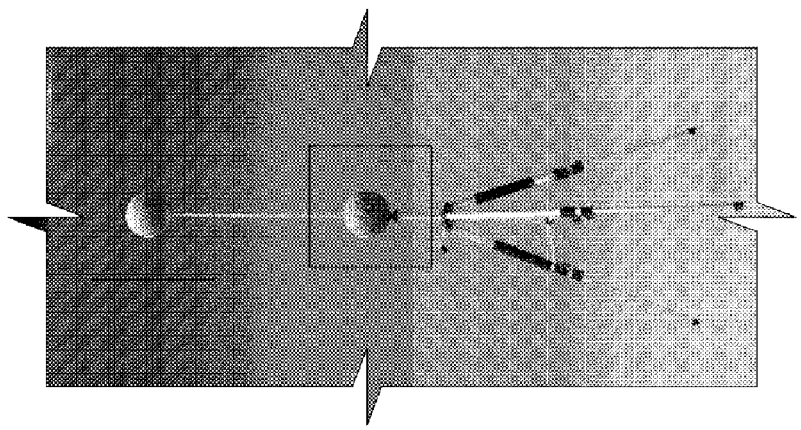

[Fig.25]
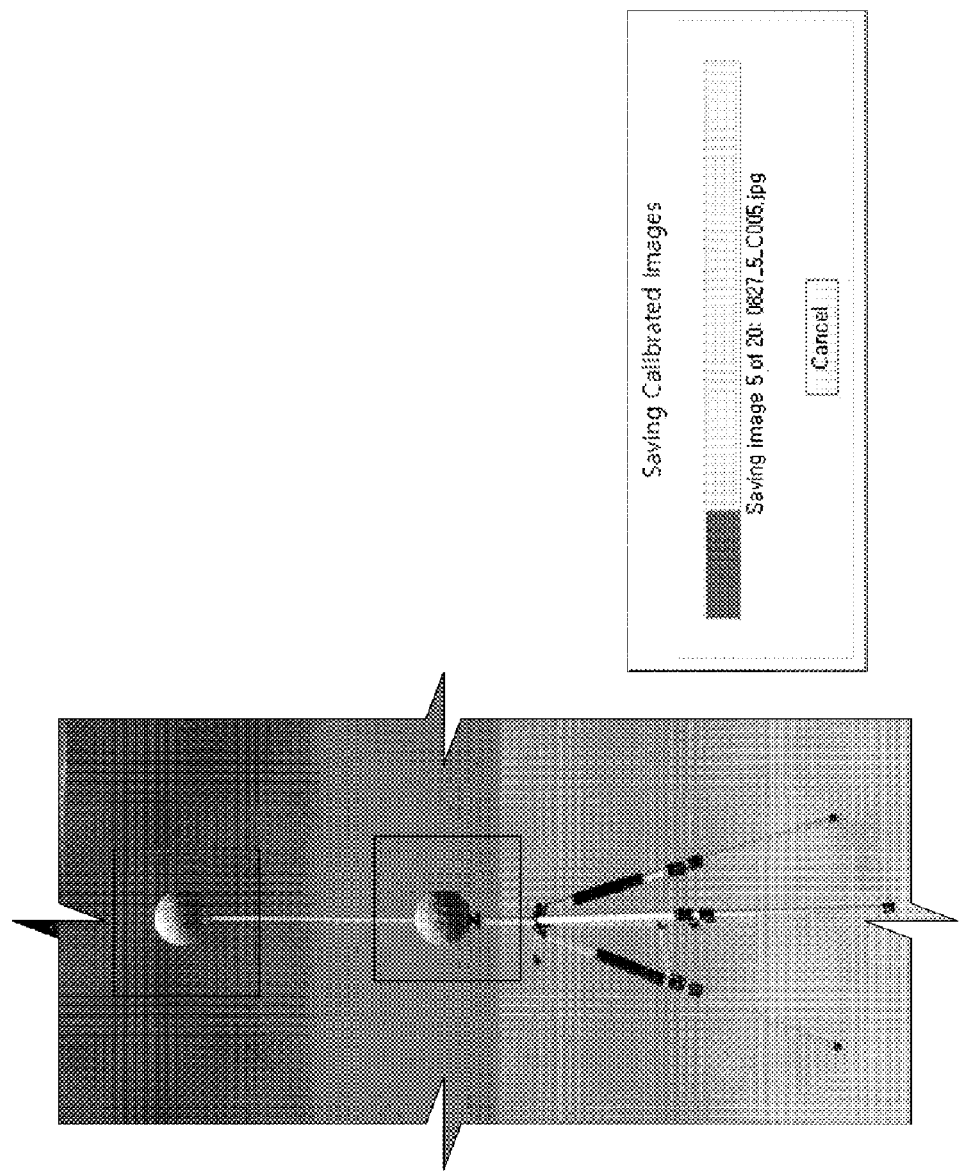

[Fig.26]
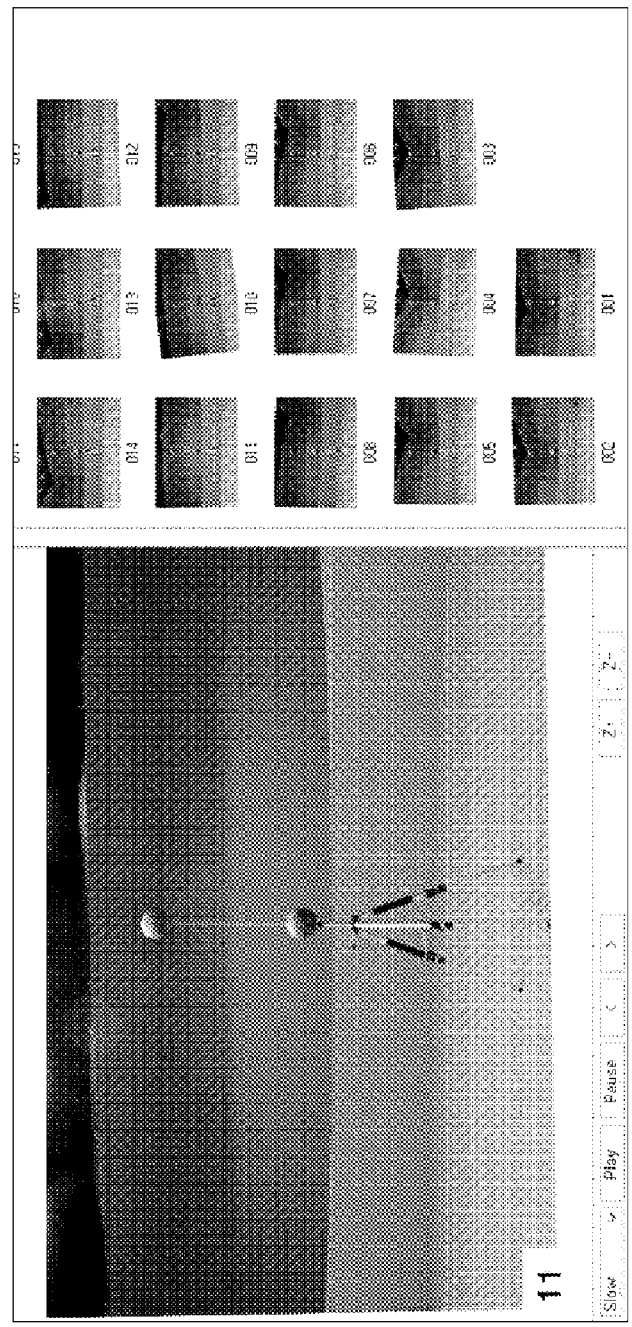

METHOD FOR CORRECTING IMAGE OF MULTI-CAMERA SYSTEM BY USING MULTI-SPHERE CORRECTION DEVICE

TECHNICAL FIELD

The present invention relates generally to a method for correcting an image. More particularly, the present invention relates to a method for correcting an image of a multi-camera system by using a multi-sphere calibration apparatus, in which a correction value for a geometric error of each camera is determined in advance by using the multi-sphere calibration apparatus, and when an actual subject is captured, the correction value is applied to minimize an effect of camera error.

BACKGROUND ART

With the development of multimedia technology, interest in realistic media is increasing recently.

Among such technologies, a multi-view video means a set of images obtained by using two or more cameras. Unlike conventional single-view video, multi-view video can generate a three-dimensional dynamic image by capturing one scene through multiple cameras.

The multi-view video can provide users with stereoscopic feeling through free viewpoint and wide screen. Further, a depth map can be extracted from a multi-view image by a method such as stereo matching to generate a three-dimensional stereoscopic image.

Recently, various multi-view video application fields have been studied, and research on freeview TV (FTV), 3-D TV, surveillance, immersive teleconferencing, etc. has been actively conducted.

In order to acquire a multi-view video, a multi-view camera array is constructed by arranging a multi-view camera in a predetermined form.

There are various types of multi-view camera arrays. Among such arrays, a parallel array and an arc array are mainly used, and such arrays can be composed of one-dimensional or two-dimensional arrays. For each multi-view camera array, each camera is placed at a regular distance and angle from the neighboring cameras. In practice, various types of multi-view camera array can be constructed considering the number of cameras, scene, and purpose.

However, the multi-view video has an inevitable geometric error due to errors that occur when placing the cameras according to the multi-view camera array.

These errors represent geometric errors in the one-dimensional parallel camera array and the one-dimensional arc camera array. In principle, the multi-view camera array is set to keep the array intervals and angles of the cameras constant, but when placing the cameras according to the multi-view camera array, errors occur due to the problem of manually placing the cameras. This error refers to the inconsistency of internal parameters such as camera position, direction, and focal length. Thereby, the geometric error in multi-view video makes it difficult to match multiple images of multi-view video.

This can affect the time and accuracy of the matching between images, that is, the three-dimensional image processing technique based on the correlation-depth map generation, intermediate image generation, etc., thereby affecting the coding efficiency. In addition, there is a problem that it is difficult to obtain a smooth viewpoint change in viewing the generated multi-view video. Therefore, a method for compensating the above-described geometric error is required.

In the case of a stereo camera system, image rectification can be used to solve the above described problem. The image rectification method is a method in which all the epipolar lines of two images are paralleled such that the vertical mismatch is straightened.

When image rectification is performed, two image planes are located on the same plane, and corresponding points of the two images have the same vertical coordinate.

However, there are relatively few studies on the correction of geometric errors in multi-view video and there are not many available algorithms.

DISCLOSURE

Technical Problem

Accordingly, the present invention is intended to provide a method for correcting an image of a multi-camera system by using a multi-sphere calibration apparatus in order to correct errors in a multi-view image caused by a geometric error in a camera array.

Technical Solution

In order to achieve the above object, according to one aspect of the present invention, there is provided a method for correcting an image of a multi-camera system by using a multi-sphere calibration apparatus, in which a multi-sphere calibration apparatus with at least two spheres vertically arranged on a support at predetermined intervals and a calibration unit are used, the method including: calibration parameter acquisition for determining by the calibration unit a calibration parameter value for a geometric error of each camera by using the multi-sphere calibration apparatus; and image calibration for correcting and outputting an image obtained by photographing an actual subject by the calibration unit by using the calibration parameter acquired in the step a.

The calibration parameter acquisition step may include: disposition of at least two cameras on a circumference of a circle at predetermined angular intervals with same radius R based on a same center point; disposition of the multi-sphere calibration apparatus at the center point; setting of at least one of a zoom, an aperture, ISO, and resolution of the each camera such that a center of each camera image becomes a center of the multi-sphere calibration apparatus; acquisition of an image of the multi-sphere calibration apparatus from the each camera by an image input unit of the calibration unit; and determination and storage of the calibration parameter of each image by a controller of the calibration unit.

A calibration value may be calculated in such a way that at least one calibration parameter for an XY shifts, a tilt, and a size is determined by the controller, and a calibration parameter value for the each camera is stored as a calibration parameter value chart in a storage.

The image calibration step may include: disposition of a subject at a center of cameras after removing the calibration apparatus acquisition of an image for the subject from the each camera by an image input unit of the calibration unit; and output of a calibrated image by applying the calibration parameter value stored in the image of the each camera to an image of each subject by a controller of the calibration unit.

Advantageous Effects

According to the method for correcting an image of a multi-camera system by using a multi-sphere calibration apparatus of the present invention, it is advantageous in that since before capturing a subject, the multi-sphere calibration apparatus is used to set a calibration value for a geometric error of each camera, and the geometric error may be reduced by reflecting the calibration value of the image input from each camera during camera shooting, a more accurate image can be obtained.

DESCRIPTION OF DRAWINGS

FIG. 1 is a view showing a system for acquiring five images of a subject;

FIG. 2 is a view showing the images obtained from the system of FIG. 1;

FIG. 3 is a view showing a state where four cameras are arranged at an angle of 30 degrees;

FIG. 4 is a view showing images obtained from the cameras of FIG. 3;

FIG. 5 is a view showing a center shift of the present invention;

FIG. 6 is a view showing an image tilt of the present invention;

FIG. 7 is a view showing an image size of the present invention;

FIG. 8 is a view showing a multi-sphere calibration apparatus used in the present invention;

FIG. 9 is a view showing a mechanical position of the multi-sphere calibration apparatus vertically disposed on the camera setting plane at the center of the circle of cameras;

FIG. 10 is a view showing an example of a two-sphere or three-sphere calibration apparatus;

FIG. 11 is a reference view showing a method for calculating calibration parameters by using a three-sphere calibration apparatus;

FIG. 12 is a view showing images obtained from the cameras of FIG. 11;

FIG. 13 is a view showing an example of a three-sphere calibration apparatus;

FIG. 14 is a view showing a method for calculating a calibration parameter for XY shifts;

FIG. 15 is a view showing a method for calculating a calibration parameter for tilt;

FIG. 16 is a view showing a method for calculating a calibration parameter for size;

FIG. 17 is a view showing an example of a two-sphere calibration apparatus;

FIG. 18 is a view showing another example of a two-sphere calibration apparatus;

FIG. 19 is a diagram showing a main configuration of the multi-sphere calibration apparatus of the present invention;

FIG. 20 is a detailed diagram showing an calibration unit;

FIG. 21 is a flowchart showing a calibration method by using the multi-sphere calibration apparatus of the present invention; and FIGS. 22 to 26 are reference views showing a calibration method by using the two-sphere calibration apparatus.

BEST MODE

All terms or words used herein should not be interpreted as being limited merely to common and dictionary meanings but should be interpreted as having meanings and concepts which are defined within the technical scope of the present invention.

Hereinbelow, exemplary embodiments of the present invention will be described in detail with reference to the accompanying drawings.

Firstly, a problem to be solved by a correction method of the present invention will be described with reference to FIGS. 1 to 4.

FIG. 1 is a view showing a system for acquiring five images of a subject, and FIG. 2 is a view showing the images obtained from the system of FIG. 1.

Referring to FIG. 1, a multi-camera system is used to capture multiple videos or images of a subject from different angles.

FIG. 1 shows a system that can be used to capture a video or an image using a human being as a subject using five cameras (camera 1 to camera 5), and camera settings such as zoom, aperture, ISO, resolution, etc., are set to produce images that are as consistent as possible.

The images captured by the cameras can be arranged as a video or image (hereinafter, referred to as an image) of the subject at various angles according to the position of each camera as shown in FIG. 2.

Since multiple cameras are used to capture images of the same subject, it can be seen that any change in the camera settings can cause discrepancy in the image of the subject when looking at another image from one image viewpoint.

As the first cause, this discrepancy may occur when a given camera does not correctly point to the center of the subject relative to another camera.

This can be attributed to the positional shift to the subject of the image when compared to other images.

As the second cause, the discrepancy may occur when the camera is tilted at a predetermined angle relative to other cameras.

In this case, it can be said that the subject's tilt toward the image when compared to other images is the cause.

As the third cause, the discrepancy may occur when the camera is at a different distance from the subject than the other cameras.

In this case, it can be said that the size difference of the subject in the image compared with the subjects in other images is a cause.

Another example will be described with reference to the drawings.

FIG. 3 is a view showing a state where four cameras are arranged at intervals of 30 degrees from each other, and FIG. 4 is a view showing images obtained from the cameras of FIG. 3. As shown in the drawings, four cameras are used to capture an image of a subject, and cameras (blue balls) are arranged at intervals of 30 degrees throughout 90 degrees with respect to the subject.

Also in this case, the same settings are used so that the camera settings (zoom, aperture, ISO, resolution, etc.) can produce images that are as consistent as possible.

Assuming that the hardware and configuration of the cameras are the same, the ideal images will be obtained from the four cameras, and the ideal images will have the same location, angle, and size.

However, when comparing images, there will be a defect in the actual captured image due to inconsistencies caused by hardware (camera/lens) and imperfection in installation process (human error) (hereinafter, referred to as a geometric error of a camera).

In other words, referring to FIG. 4, the ideal images and the actual captured images will be different for each angle.

Accordingly, the present invention is intended to solve these three changes (center shift, tilt angle, size change) by using a multi-sphere calibration apparatus so that the position, angle and size of the subject caused by the geometric error of each camera can be matched during multi-camera shooting.

Both the multi-sphere calibration apparatus and the calibration method may be applied to video recording and photographing, and hereinafter, an image means an image including both a video image and a photo image.

Firstly, reference will be made to calibration parameters used in the present invention.

The present invention is used to correct an image continuously input from each camera by calculating calibration parameters for each camera from an image of the multi-sphere calibration apparatus.

The calibration parameters obtained from the multi-sphere calibration apparatus for calibrating the geometric errors of each camera in the present invention are used to correct the captured continuous images so that the resulting image becomes the ideal image.

To achieve this, in the present invention, three calibration parameters for "XY shifts", "tilt", and "size" are used.

Firstly, "XY shifts" is as follows.

The actual center of the subject tends to be shifted relative to the desired center of the subject.

For example, in the image captured by each camera, the actual image can be shifted by Dx and Dy in the X and Y axis directions from the center of the ideal image of the subject.

Referring to FIG. 5 for showing a center shift of the present invention, it can be seen that the center of the actually captured image on the right is shifted by Dx and Dy compared to the center of the ideal image on the left.

Secondly, "tilt" is as follows.

The actual captured image is rotated and displayed compared to the ideal subject.

Referring to FIG. 6 for showing a tilt, it can be seen that the image of the subject actually captured is inclined at a certain angle (A-tilt angle) compared to the ideal image of the subject.

Thirdly, "size" is as follows.

The size of the subject is different from the actually captured image size of the subject.

Referring to FIG. 7 for showing an image size of the present invention, it can be seen that the actually captured image is smaller than the ideal image by "h" from "H".

Accordingly, in the present invention, the calibration parameters in Table 1 are used to apply to the multi-sphere calibration apparatus for each camera.

TABLE 1

| Parameter | Remarks |
|---|---|
| dX | horizontal center shift deviation of subject |
| dY | vertical center shift deviation of subject |
| dA | angle deviation of subject t |
| dH | size ratio deviation of subject (h/H) |

The calibration parameters are used to calibrate the XY positions, tilt angle, and size of the continuous image captured in each camera to the same or close to those of the image of the desired ideal subject.

To achieve this, in the present invention, the multi-sphere calibration apparatus is used to acquire the calibration parameters.

In other words, in the present invention, the multi-sphere calibration apparatus is used to determine the calibration parameters for each camera.

The determined calibration parameters are used to correct the input image continuously captured in each camera.

Referring to FIG. 8 showing a multi-sphere calibration apparatus used in the present invention, the multi-sphere calibration apparatus of the present invention may use two to three spheres, and should be configured as follows.

Firstly, at least two spheres are used, wherein the spheres are placed in a straight line.

Referring to the drawings, three spheres are arranged at a regular interval on one straight support in the left figure, and two spheres are arranged on one straight support in the right figure.

In the multi-camera system, when the multi-sphere calibration apparatus is used, the multi-sphere calibration apparatus should be placed orthogonal to the plane of the camera.

Referring to FIG. 9 showing a mechanical position of the multi-sphere calibration apparatus vertically disposed on the camera setting plane at the center of the circle of cameras, the multi-sphere calibration apparatus is orthogonal to the plane of multiple cameras and a multi-sphere calibration apparatus is placed at the center of the circle of cameras.

In this arrangement, the image obtained from each camera is almost identical to the image of the multi-sphere calibration apparatus.

Further, the multi-sphere calibration apparatus may also be used with various colors and lighting spheres depending on the surrounding environment.

FIG. 10 is a view showing an example of a two-sphere or three-sphere calibration apparatus.

The left view shows a three-sphere calibration apparatus and the right view shows a two-sphere calibration apparatus, wherein the three-sphere calibration apparatus is configured such that three spheres are arranged up and down on a vertical line, that is, an upper sphere 110, a middle sphere 120, and a lower sphere 130 are disposed to a support 150 in a vertical direction at predetermined intervals, and a lower portion of the support 150 is fixed to a pedestal 140 of the calibration apparatus.

Further, the two-sphere calibration apparatus is configured such that two spheres are arranged up and down on a vertical line, that is, an upper sphere 111 and a middle sphere 121 are disposed to the support 150 in a vertical direction at predetermined intervals, and the lower portion of the support 150 is fixed to the pedestal 140 of the calibration apparatus.

Referring to the drawings, when the shooting environment is dark, a bright color or lighting spheres may be used, and depending on the shooting environment, a bright, dark, saturated color sphere may be used.

Hereinbelow, reference will be made to a method for calculating the calibration parameters by using the three-sphere calibration apparatus.

Firstly, referring to a diagram in FIG. 19 showing a main configuration of the multi-sphere calibration apparatus of the present invention, and a detailed diagram in FIG. 20 showing an calibration unit, an image correction apparatus of a multi-camera system by using the multi-sphere calibration apparatus of the present invention includes: a three-sphere calibration apparatus 100; multiple cameras 1 to 5; a calibration unit 200 configured to determine and store calibration parameter values based on an image obtained from the multiple cameras 1 to 5, position of the subject to be actually photographed at the position of the three-sphere calibration apparatus, receive images from the cameras 1 to 5 that captured the actual subject, calibrate each image with the stored calibration parameter value, and output the same.

Referring to FIG. 11 showing a method for calculating calibration parameters by using the three-sphere calibration apparatus, to obtain a calibration parameter value for each camera, in the center radius "R", each of the cameras 1 to 5 is placed in a circular shape with a radius R of each camera with the separation angle of each camera as "A", and a three-sphere calibration apparatus 110 is disposed at the center of the circle of cameras.

The three-sphere calibration apparatus 110 is configured, as described above, such that the three spheres are arranged up and down on a vertical line, that is, the upper sphere 110, the middle sphere 120, and the lower sphere 130 are disposed to the support 150 in a vertical direction at predetermined intervals, and the lower portion of the support 150 is fixed to the pedestal 140 of the calibration apparatus.

Images obtained from the cameras 1 to 5 arranged as described above are shown in FIG. 12.

FIG. 12 is a view showing images obtained from the five cameras 1 to 5 arranged in a circle, the images of the three-sphere calibration apparatus obtained from each camera show a slight difference in position, size, and angle.

Referring to the drawing, the image obtained from camera 1 and the image obtained from camera 2, the image obtained from camera 3, the image obtained from camera 4, and the image obtained from camera 5 are sequentially shown.

Ideally, if the camera settings are perfect, all images captured by each camera should be the same, but practically each image is not the same.

In other words, it can be seen that at least one of XY shifts, tilt, or size is changed for each of the acquired images with respect to a predetermined image.

To calibrate this, an image of the three-sphere calibration apparatus acquired from each camera 1 to 5 is input to the calibration unit 200.

The calibration unit 200 may be a terminal or a mixer operating as an image processor and serves as a device for calibrating and outputting an input image.

To achieve this, the calibration unit 200 may include: an image input unit 220 configured to receive images captured by the cameras 1 to 5; a calibration parameter calculation unit 230 configured to receive the images of the three-sphere calibration apparatus input into the image input unit 220 and calculate calibration parameter value; a storage 240 configured to store the calibration value calculated by the calibration parameter calculation unit 230 as a "calibration parameter value chart" for each camera; an image calibration unit 250 configured to calibrate each image captured from the actual subject by reading a "calibration parameter value chart" for each camera stored in the storage 240, and output the same; and a controller 210 configured to control each component to determine the calibration value and generate a calibrated image by applying the calibration value to the actual image.

Firstly, the controller 210 calculates a center value (cXN, cYN) of the three-sphere calibration apparatus 100.

Referring to FIG. 13 for showing an example of a three-sphere calibration apparatus, in the three-sphere calibration apparatus, the center value "cXN, cYN" of each sphere 110, 120, 130 is calculated.

In other words, the center values (cX1, cY1), (cX2, cY2), and (cX3, cY3) of three spheres, the upper sphere 110, the middle sphere 120, and the lower sphere 130, are determined by a common circle center detection algorithm.

Since the circle center detection algorithm is commonly known, a detailed description thereof is omitted.

Using the center values, three calibration parameters (XY shifts, tilt, and size) are calculated for each image of the three-sphere calibration apparatus.

Firstly, reference will be made to a calibration parameter of XY shifts.

Firstly, the controller 210 uses the calculation of center shift values to determine the calibration parameter "XY shifts".

In the three-sphere calibration apparatus, the XY shifts value uses "cX2, cY2" which is the center value of the middle sphere 120.

Referring to FIG. 14 for showing a method for calculating a calibration parameter for XY shifts, the controller 210 receives the image of the three-sphere calibration apparatus from each camera and determines the XY shifts. For example, if XY shifts of the center value (cX2, cY2) of the middle sphere 120 of the three-sphere calibration apparatus is shifted to the "+", the XY shift value at the "+" point is determined by Equation 1.

$$dX=(cX0-cX2), dY=(cY0-cY2) \quad \text{[Equation 1]}$$

"cX0 and cY0" are the center position value of the acquired image, "cX2 and cY2" are the center value of the middle sphere of the calibration apparatus, dX is the shift value in the x direction based on "+" in the drawing, and dY is the shift value in the y direction, which may be specified as the center point of each camera image or manually specified.

Referring to Equation 1, it can be seen how the XY position of the image obtained from the camera is shifted from the middle sphere center value of the calibration apparatus.

The controller 210 stores the calibration values dx and dy in the calibration parameter value chart of the corresponding camera in the storage 240.

The calibration parameter of tilt is calculated as follows.

The present invention uses an upper sphere and a lower sphere for tilt calculation.

Referring to FIG. 15 for showing a method for calculating a calibration parameter for tilt, as described above, it is calculated that how much the center value (cX3, cY3) of the upper sphere is tilted based on the center value (cX1, cY1) of the lower sphere 130.

In other words, based on the center value (cX1, cY1) of the lower sphere 130, the tilt of the center value (cX3, cY3) of the upper sphere 110 may be expressed as Equation 2.

$$dA=\arctan((cX3-cX1)/(cY3-cY1)) \quad \text{[Equation 2]}$$

dA is the tilt value, and the ideal tilt value is "0".

Also in this case, the controller 210 stores the calibration values dx and dy in the calibration parameter value chart of the corresponding camera in the storage 240.

Next, the controller 210 determines the calibration parameter for size.

The calculation of size is performed by calculation of the size ratio value, and the calculation of the size ratio value is performed using the center value of the upper sphere and the lower sphere as the following Equation.

$$dH=H0/\sqrt{\text{sqr}(cX1-cX3)+\text{sqr}(cY1-cY3)} \quad \text{[Equation 3]}$$

H0 is an ideal value, which may be calculated from an average value or an individual value from any one image, or may be manually specified.

Referring to FIG. 16 for showing a method for calculating a calibration parameter for size, the center value (CX3 and cY3) of the upper sphere 110 and the center value (cX1 and cY1) of the lower sphere 130 are determined, a distance h between the center value (CX3 and cY3) of the upper sphere 110 and the center value (cX1 and cY1) of the lower sphere 130 is calculated, and the distance value is used to determine a change in size of the standard size.

Each calibration parameter value obtained by the Equation described above is calculated for each camera and stored in the storage 210 as a "calibration parameter value chart" file.

The calibration parameter value chart is illustrated in Table 2 below.

TABLE 2

| Camera Number | dX | dY | dA | dH |
|---|---|---|---|---|
| 1 | dX1 | dY1 | dA1 | dH1 |
| 2 | dX2 | dY2 | dA2 | dH2 |
| 3 | dX3 | dY3 | dA3 | dH3 |
| * | * | * | * | * |
| * | * | * | * | * |
| * | * | * | * | * |
| n | dXn | dYn | dAn | dHn |

In Table 2, calibration parameters for each camera are stored as a table with values of "dX, dY, dA, and dH".

The calibration values stored in the storage 240 are applied to an image continuously acquired from each camera such that the image approaches an ideal image, whereby a calibrated image is output by calibrating the image.

Hereinafter, a calibration parameter acquisition method using a two-sphere calibration apparatus will be described with reference to the drawings.

FIG. 17 is a view showing an example of a two-sphere calibration apparatus, and as shown in the drawing, the two-sphere calibration apparatus of the present invention uses the same algorithm as the three-sphere calibration apparatus described above to calculate the tilt and size calibration parameters by using the upper sphere 111, the lower sphere 131, and the center positions (center values) of the spheres.

For the "XY shifts" calibration value, the center points (center values) of the two spheres are used in the same manner as the three-sphere calibration apparatus.

A disadvantage of the two-sphere calibration apparatus is that it is difficult for cameras to attempt to point to the center of the calibration apparatus without a clear indication, such as the middle sphere in the three-sphere calibration apparatus.

FIG. 18 is a view showing another example of a two-sphere calibration apparatus.

Referring to the drawing, two spheres, that is, the upper sphere (cX3 and cY3), and the middle sphere (cX2 and cY2) are used to calculate the tilt and size, and the middle sphere (cX2 and cY2) is used for center position.

A disadvantage of the two-sphere calibration apparatus is that it does not use the full extension of the image, which may lead to inaccurate size and tilt calculations.

The calibration method by using the two-sphere calibration apparatus will be described below.

A method of obtaining a calibrated image by using a multi-sphere calibration apparatus using the above-described configuration will be described with reference to the drawings.

FIG. 21 is a flowchart showing a calibration method by using the multi-sphere calibration apparatus of the present invention, as shown in the drawing, wherein, a method for correcting an image of a multi-camera system by using a multi-sphere calibration apparatus of the present invention includes: a calibration parameter acquisition step for determining the calibration parameter value of each camera using the multi-sphere calibration apparatus to calibrate a geometric error of each camera (S100); and an image calibration step for correcting an image obtained by photographing an actual subject by using the calibration parameters obtained in step S100 (S200).

The calibration parameter acquisition step S100 performs a step of arranging multiple cameras (S110).

In the multiple camera arrangement in step S110, multiple cameras 1 to 5 are arranged on the circumference at regular angles A with the same radius R based on the same center point as shown in FIG. 13.

In other words, in step S110, a virtual circle is set, and at least two cameras are arranged at a predetermined angle on the circumference with reference to the center point of the circle.

When the placement of multiple cameras is completed, the multi-sphere calibration apparatus (the three-sphere calibration apparatus in the embodiment) is positioned at the center point P of the multiple cameras (S120).

Then, each camera (zoom, aperture, ISO, resolution, etc.) is set such that the center value (cX2, cY2) of the middle sphere 120 of the three-sphere calibration apparatus is set so that the center of the camera image is the center of the calibration apparatus (S130).

When the setting of the camera is completed in step S130, the controller 210 of the calibration unit 200 acquires an image of the three-sphere calibration apparatus from each camera through the image input unit 220 (S140).

After that, the controller 210 determines the center value, which is the center value of the sphere for the acquired image (S150).

In other words, in step S150, the center value "cX2 and cY2" of the middle sphere 120 of the calibration apparatus is determined.

When the center value is determined in step S150, the controller 210 determines calibration values for XY shift, tilt, and size of an image for each camera (S160).

Once three calibration parameter values (XY shifts, tilt, and size) for each camera are determined, the controller 210 stores the calibration parameter value chart in the storage 240.

When the values for the calibration parameters are determined and stored in the storage 240 in step S100, an image calibration step for correcting the image by photographing the actual subject is performed (S200).

In the image calibration step S200, firstly, the three-sphere calibration apparatus is removed, and at the center of the cameras, a subject is placed at the location of the three-sphere calibration apparatus (S210).

When each of the cameras 1 to 5 acquires an image of the subject and outputs the same to the calibration unit 200, the controller 210 performs an image calibration step (S220).

To be more specific, the controller 210 calibrates images of the subject input from each of the cameras 1 to 5 by calibrating an image of the corresponding camera from the "calibration parameter value chart" stored in the storage 240 to output a calibrated image.

Hereinafter, a two-sphere calibration method will be briefly described with reference to the drawings.

FIGS. 22 to 26 are reference views showing a calibration method by using the two-sphere calibration apparatus, and the calibration method by using the two-sphere calibration apparatus may also be performed in the same way as the three-sphere calibration.

In other words, the calibration method by using the two-sphere calibration apparatus includes: a calibration parameter acquisition step for determining the calibration parameter value of each camera using the multi-sphere calibration apparatus to calibrate a geometric error of each camera (S100); and an image calibration step for correcting an image obtained by photographing an actual subject by using the calibration parameters obtained in step S100 (S200).

The calibration parameter acquisition step S100 performs a step of arranging multiple cameras (S110).

In the multiple camera arrangement in step S110, multiple cameras 1 to 5 are arranged on the circumference at regular angles A with the same radius R based on the same center point as shown in FIG. 13.

In other words, in step S110, a virtual circle is set, and at least two cameras are arranged at a predetermined angle on the circumference with reference to the center point of the circle.

When the placement of multiple cameras is completed, the multi-sphere calibration apparatus (the three-sphere calibration apparatus in the embodiment) is positioned at the center point P of the multiple cameras (S120) (see FIG. 22).

Then, each camera (zoom, aperture, ISO, resolution, etc.) is set such that the center value ($cX2$, $cY2$) of the middle sphere 120 of the three-sphere calibration apparatus is set so that the center of the camera image is the center of the calibration apparatus (S130) (see FIG. 23).

When the setting of the camera is completed in step S130, the controller 210 of the calibration unit 200 acquires an image of the three-sphere calibration apparatus from each camera through the image input unit 220 (S140).

After that, the controller 210 determines the center value, which is the center value of the sphere for the acquired image (S150).

In other words, in step S150, the center value "$cX2$ and $cY2$" of the middle sphere 120 of the calibration apparatus is determined.

When the center value is determined in step S150, the controller 210 determines calibration values for XY shift, tilt, and size of an image for each camera (S160).

Once three calibration parameter values (XY shifts, tilt, and size) for each camera are determined, the controller 210 stores the calibration parameter value chart in the storage 240.

Referring to FIG. 24, the calibration settings for the acquired image are displayed in the lower right corner of the screen along with the center value.

The values for the calibration parameters are determined and stored in the storage 240 in step S100.

Referring to FIG. 25, the screen shows that the determined calibration parameter values are being stored.

When the calibration parameter values are stored, an image calibration step for correcting the image by photographing the actual subject is performed (S200).

In the image calibration step S200, firstly, the two-sphere calibration apparatus is removed, and at the center of the cameras, a subject is placed at the location of the two-sphere calibration apparatus (S210).

Referring to FIG. 26, by placing the actual subject (the same two-sphere calibration apparatus used in the embodiment) at the location, each of the cameras 1 to 5 acquires an image of the subject and outputs the same to the calibration unit 200, and then the controller 210 performs an image calibration step (S220).

To be more specific, the controller 210 calibrates images of the subject input from each of the cameras 1 to 5 by calibrating an image of the corresponding camera from the "calibration parameter value chart" stored in the storage 240 to output a calibrated image.

It is understood by those skilled in the art that the foregoing description is a preferred embodiment of the disclosed device and that various changes and modifications may be made in the invention without departing from the spirit and scope thereof.

DESCRIPTION OF REFERENCE CHARACTERS OF IMPORTANT PARTS

100: sphere calibration apparatus 110,111: upper sphere
120: middle sphere 130,131: lower sphere
140: pedestal 150: support
200: calibration unit 210: controller
220: image input unit 230: calibration parameter calculation unit
240: storage 250: image calibration unit

The invention claimed is:

1. A method for correcting images of a multi-camera system using a multi-sphere calibration apparatus, the method comprising:
    capturing images of the multi-sphere calibration apparatus using cameras of the multi-camera system;
    for each of the cameras of the multi-camera system, computing shift calibration values in x and y directions using a center position in one or more images of the multi-sphere calibration apparatus captured by that camera that is compared to an actual center position of the multi-sphere calibration apparatus;
    for each of the cameras of the multi-camera system, computing a tilt calibration value using a center of an upper sphere and a center of a lower sphere of the multi-sphere calibration apparatus in one or more images of the multi-sphere calibration apparatus captured by that camera, where an ideal tilt value is zero;
    for each of the cameras of the multi-camera system, computing a size calibration value using a distance between the center of the upper sphere and the center of the lower sphere of the multi-sphere calibration apparatus in one or more images of the multi-sphere calibration apparatus captured by that camera that is compared to a predetermined ideal value;
    storing the shift calibration values, the tilt calibration value and the size calibration value for each of the cameras of the multi-camera system; and
    correcting and outputting new images of an actual subject captured by the cameras of the multi-camera system using the stored shift calibration values, the tilt calibration value and the size calibration value for each of the cameras of the multi-camera system.

2. The method of claim 1, wherein the actual center position of the multi-sphere calibration apparatus is a midpoint between the center of the upper sphere and the center of the lower sphere of the multi-sphere calibration apparatus.

3. The method of claim 1, wherein the actual center position of the multi-sphere calibration apparatus is a center of a middle sphere positioned between the upper sphere and the lower sphere of the multi-sphere calibration apparatus.

4. The method of claim 3, wherein the multi-sphere calibration apparatus is configured such that the upper, middle and lower spheres are disposed on a support in a vertical direction at predetermined intervals so that the support is exposed between the upper, middle and lower spheres.

5. The method of claim 1, wherein computing the shift calibration values in the x and y directions includes using equations:

$$dX=(cX0-cX2) \text{ and } dY=(cY0-cY2),$$

where cX0 and cY0 are center position values of the center position in one or more images of the multi-sphere calibration apparatus, cX2 and cY2 are center position values of the actual center position of the multi-sphere calibration apparatus, dX is the shift calibration value in the x direction and dY is the shift calibration value in the y direction.

6. The method of claim 5, wherein computing the tilt calibration value includes using an equation:

$$dA = \arctan(cX3-cX1)/(cY3-cY1),$$

where cX1 and cY1 are center position values of the center of the upper sphere of the multi-sphere calibration apparatus, cX3 and cY3 are center position values of the center of the lower sphere of the multi-sphere calibration apparatus, dA is the tilt calibration value.

7. The method of claim 6, wherein computing the size calibration value includes using an equation:

$$dH = H0/\sqrt{\mathrm{sqr}(cX1-cX3)+\mathrm{sqr}(cY1-cY3)},$$

where H0 is the predetermined ideal value and dH is the size calibration value.

\* \* \* \* \*